United States Patent [19]

Niemann

[11] 4,364,171
[45] Dec. 21, 1982

[54] METHOD FOR FABRICATING ISOLATED PHASE BUS

[75] Inventor: Roy A. Niemann, Aston, Pa.

[73] Assignee: Canadian General Electric Company Limited, Toronto, Canada

[21] Appl. No.: 255,955

[22] Filed: Apr. 20, 1981

Related U.S. Application Data

[62] Division of Ser. No. 7,546, Jan. 30, 1979, Pat. No. 4,288,681.

[51] Int. Cl.³ .......................................... H01B 13/20
[52] U.S. Cl. .................................. 29/828; 219/60 A; 228/4.1; 228/44.1 A; 228/7
[58] Field of Search ...................... 29/828; 228/7, 6 R, 228/4.1, 44.1 A; 266/57, 61; 219/121.21, 60 A, 60 R; 148/9.6

[56] References Cited

U.S. PATENT DOCUMENTS

| | | | |
|---|---|---|---|
| 3,291,962 | 12/1966 | Walker | 228/4.1 X |
| 3,444,351 | 5/1969 | Stehle et al. | |
| 4,014,495 | 3/1977 | Oda et al. | |
| 4,052,039 | 10/1977 | Koyano et al. | |
| 4,054,771 | 10/1977 | Foulquier et al. | 219/60 A X |

Primary Examiner—Carl E. Hall
Assistant Examiner—Carl J. Arbes
Attorney, Agent, or Firm—Raymond A. Eckersley

[57] ABSTRACT

The method includes aligning a first plurality of cylindrical workpieces of a first diameter such that the longitudinal axes thereof are substantially coincident and welding the workpieces together end-to-end to form a cylindrical member of a desired length. The welding step includes rotating the workpieces about their longitudinal axes while maintaining a welding electrode at a fixed position along the workpieces and at a fixed distance from the outer circumference of the workpieces. The method includes cutting openings in the cylindrical member wherein the cylindrical member is rotated about its longitudinal axis while causing a cutting means to move linearly along the length of the cylindrical member. In one embodiment, the method is repeated with a second plurality of cylindrical workpieces of a greater diameter with some of the steps in processing the first and second plurality of workpieces being carried out at substantially the same time. Other forms of the apparatus and method are disclosed.

8 Claims, 10 Drawing Figures

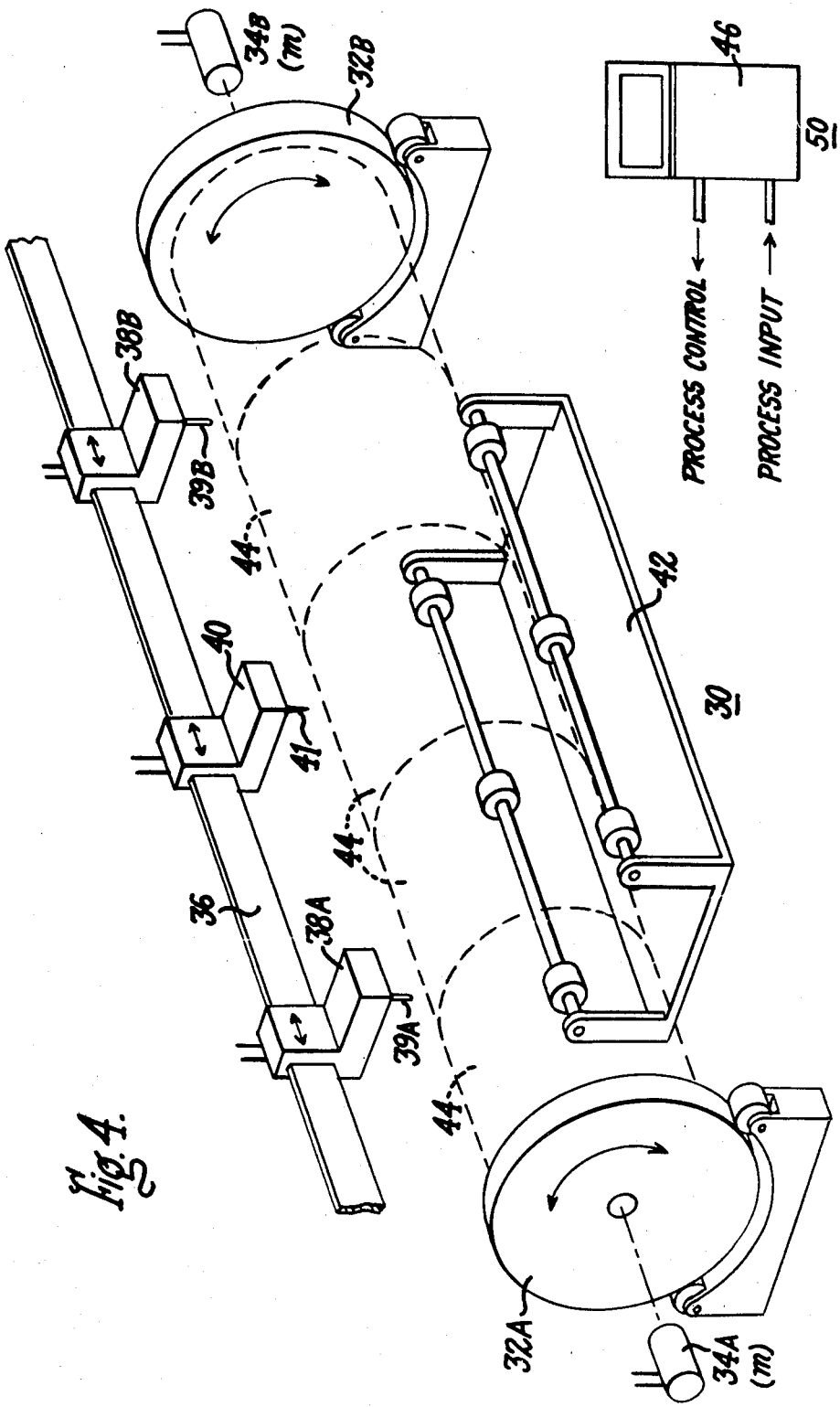

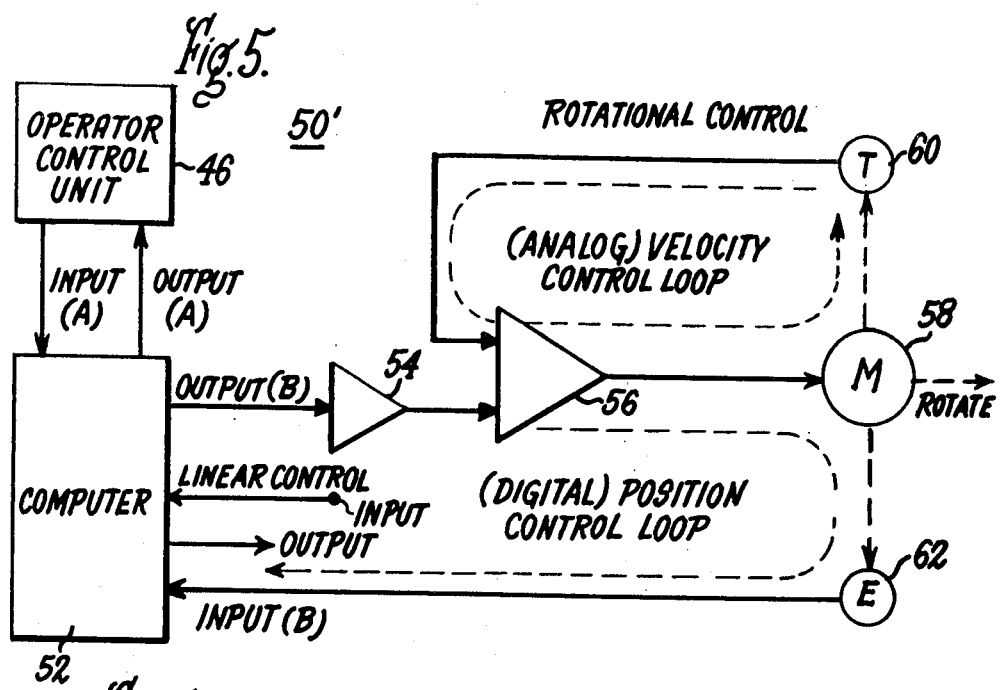
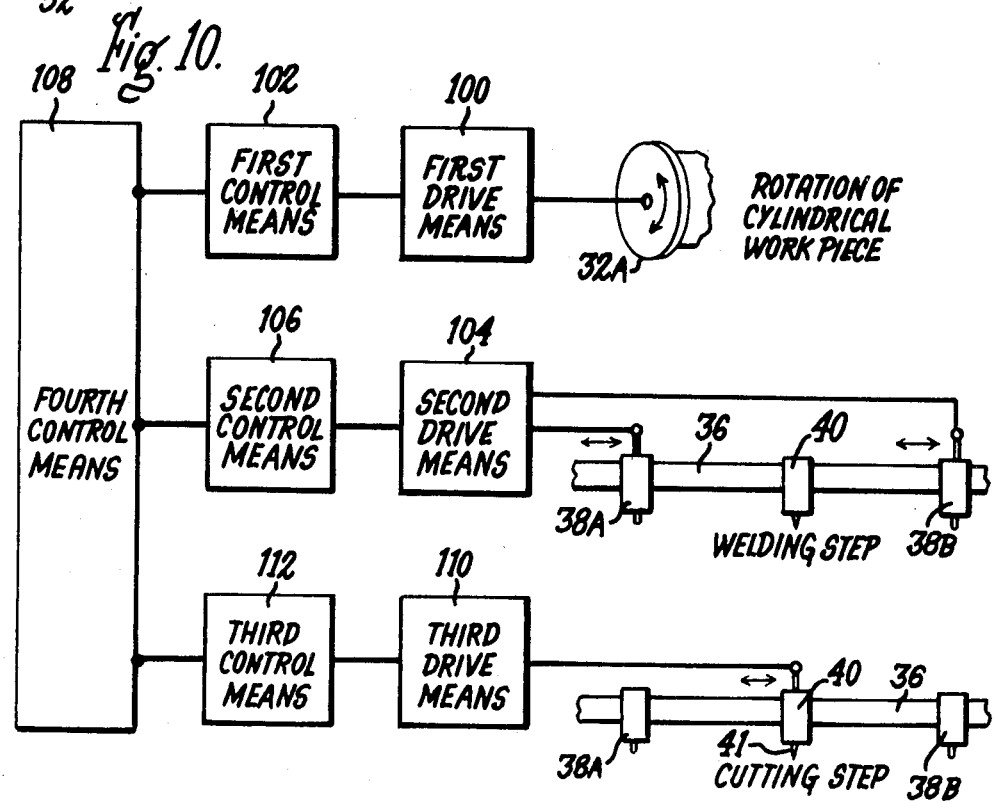

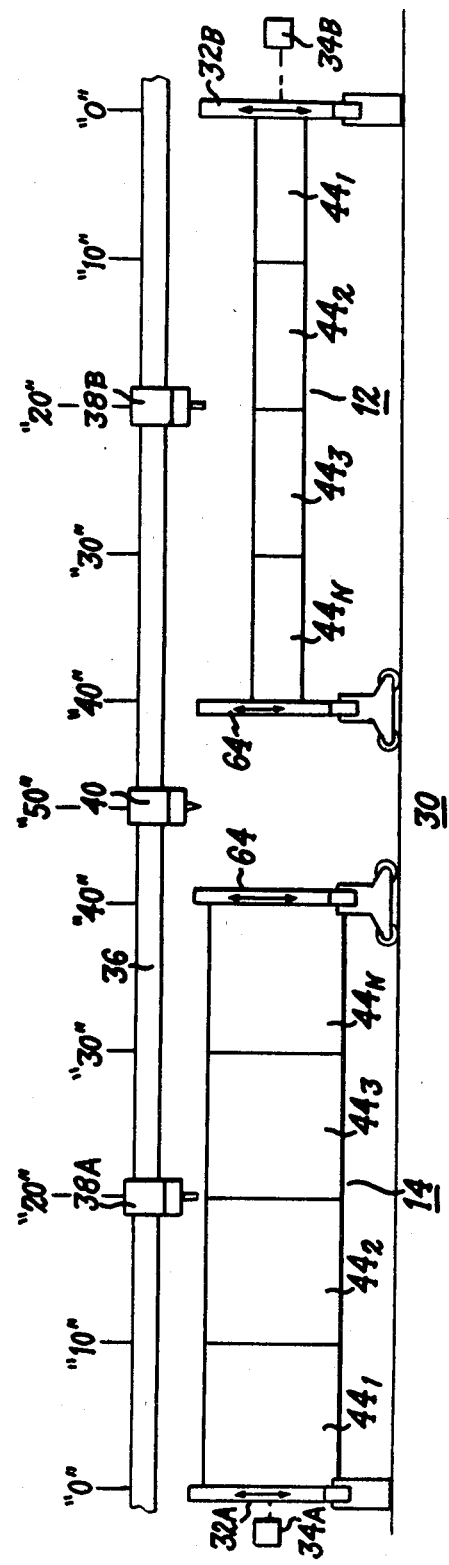

METHOD FOR FABRICATING ISOLATED PHASE BUS

This is a division of application Ser. No. 7,546, filed Jan. 30, 1979 and now U.S. Pat. No. 4,288,681 issued Sept. 8, 1981.

BACKGROUND OF THE INVENTION

The present invention relates to an isolated phase bus system, and more particularly to a method for fabricating such an isolated phase bus system.

Various isolated phase bus systems have been disclosed heretofore. Exemplary isolated phase bus systems are shown in U.S. Pat. No. 2,972,005, entitled, "Isolated Phase Bus Duct Apparatus", issued to Brealey et al on Feb. 14, 1961, and assigned to the assignee of the present application. Another exemplary isolated phase bus system is shown in U.S. Pat. No. 3,654,378, entitled "Bus Duct Assembly", issued to Rehder on Apr. 4, 1972, and assigned to Canadian General Electric Company, Ltd.

In one typical system, a cylindrical bus conductor is secured to a plurality of spaced-apart relatively fragile insulator assemblies and mounted within a mating hollow cylindrically shaped enclosure which is maintained at ground potential. Each insulator assembly electrically insulates the cylindrical bus conductor from the surrounding enclosure and also provides support for the bus conductor. Typically, an end of the insulator assembly is secured, e.g., welded, to the enclosure at one of a plurality of mounting openings in the enclosure. Generally, the cylindrical bus conductor is respectively provided with mounting and access openings along its length through which mounting hardware, e.g., threaded bolts, can be inserted for securing the bus conductor to an unsecured opposing end of each one of the insulator assemblies. In addition to its mounting openings, the enclosure is also provided with access openings which are useful for servicing and installation purposes. The enclosure access openings are generally disposed in a position in-line with the bus conductor access openings. As will be appreciated more fully later, the enclosure mounting openings should also be disposed in a position in-line with the bus conductor mounting openings.

Although the isolated phase bus systems heretofore discussed are satisfactory for many applications, they do suffer from certain problems, One such problem is that from a manufacturing standpoint, it is very difficult to satisfactorily align the access and mounting openings in the bus conductor structure with the respective access and mounting openings in the enclosure structure. More particularly, the access and mounting openings in the bus conductor and mating enclosure, and the typical bus conductor mounting system associated therewith, impose subtantial constraints upon the assembly of the isolated phase bus system. That is, in the assembly of such a system, after one end of each of the insulator assemblies is secured, e.g., welded, to the enclosure, the appropriate bus conductor openings must be carefully, and properly aligned with the opposing end of each one of the now-secured insulator assemblies. Indeed, if not properly aligned, proper mounting within the enclosure, and securing of the bus conductor to the opposing end of each one of the already secured insulator assemblies, becomes very difficult.

To further appreciate the importance of: (1) the proper alignment of the mounting openings in the bus conductor with the mounting openings in the mating enclosure; and, (2) the proper alignment of the access openings in the bus conductor with the access openings in the mating enclosure, reference will be taken to FIG. 1.

FIG. 1 schematically depicts an isolated phase bus system, generally designated 10, in which a cylindrical bus conductor 12 is disposed in a mating cylindrical enclosure 14 and supported by double insulator assemblies, 16A, 16B, at spaced locations along the length of the bus conductor. The cylindrical bus conductor 12 and the enclosure 14 are of approximately the same length with each of the members 12, 14 respectively comprising a plurality of segments joined together end-to-end to achieve the desired length. At spaced points along the length of the bus conductor 12, the insulator assemblies 16A, 16B are provided. The insulator assemblies 16A, 16B are angularly spaced, e.g., 90° apart, around the longitudinal axis of bus conductor 12 and secured to the conductor as shown more fully in the sectional view of FIG. 2. (Note that a sectional view taken along line 2A—2A of FIG. 1 is substantially identical to the sectional view of FIG. 2). As shown by dashed lines in FIGS. 2, 3, substantial angular and longitudinal alignment is required between: the bus conductor mounting openings 18C and the enclosure mounting openings 18E; and, the bus conductor access opening 20C and the enclosure access opening 20E. Inspection of FIGS. 2, 3 reveals that any misalignment between openings 18C and 18E places severe stresses on the fragile insulator assemblies 16A, 16B. Indeed, such misalignment may render it impossible to properly assemble the isolated phase bus system 10 of FIG. 1.

In view of the importance of the previously mentioned angular and longitudinal alignment of mounting and access openings in the bus conductor and enclosure, fabrication of such isolation phase bus systems involves techniques which require precise control. For example, one technique involves: laying out all the necessary openings on a flat sheet of metal; cutting the appropriate openings; then, rounding out the flat sheet of metal into a cylindrical shape. This method is time consuming and carries a high likelihood of creating serious errors in the transformation from a two dimensional workpiece to a three dimensional workpiece. Other techniques which have been considered include tracing predetermined patterns on already existing cylindrical workpieces. Such techniques are generally awkward and inefficient.

Accordingly, a general object of the present invention is to provide a method for efficiently fabricating an isolated phase bus system of the type which includes a cylindrical bus conductor member insulatingly secured within a mating enclosure.

Another object of the present invention is to provide such a method in which alignment problems associated with bus conductor and enclosure openings are substantially reduced.

Another object of the present invention is to provide such a method which includes automated control means.

SUMMARY

In carrying out one form of my invention, I provide an apparatus for processing a plurality of cylindrical workpieces employed in the fabrication of an isolated phase bus system of the type which includes a cylindrical bus conductor and a mating enclosure therefor. The apparatus includes at least one rotatable headstock which is of a configuration to securely receive an end of a first one of a plurality of cylindrical workpieces of a first diameter. Support means is provided for rotatably supporting the plurality of cylindrical workpieces when the plurality of cylindrical workpieces are disposed in end-to-end manner such that the longitudinal axes thereof are substantially coincident. A side beam is provided adjacent to the headstock and extending along a line parallel to the axis of rotation of the rotatable headstock. Controllable workpiece welding means is coupled to the side beam. The welding means is capable of linear translation along the length of the side beam. Controllable workpiece cutting means is coupled to the side beam and is capable of linear translation along the length of the side beam. Controllable first drive means is provided for rotating the headstock so that the cylindrical workpiece secured thereto is caused to rotate about its longitudinal axis. Controllable second drive means is provided for causing the welding means to translate along the side beam. Controllable third drive means is provided for causing the cutting means to translate along the side beam. Processing control means is provided and includes: first control means for controlling the first drive means; second control means for controlling the second drive means and the activation of the welding means into welding operation; third control means for controlling the third drive means and the activation of the cutting means into cutting operation; and fourth control means for coordinating the first, second and third control means to weld a plurality of the cylindrical workpieces together in end-to-end manner and to then cut a plurality of openings in the welded-together workpieces with the welding locations and the openings being substantially precisely located in a predetermined reproducible manner.

In carrying out one form of my invention, I provide a method for use in fabricating an isolated phase bus system. The method includes providing a first plurality of cylindrical workpieces of a first diameter. The method includes disposing the first plurality of workpieces in a fixture and aligning the cylindrical workpieces such that the longitudinal axes thereof are substantially coincident. The method includes welding the workpieces together end-to-end while rotating the workpieces about the coincident longitudinal axes to form a cylindrical member of a desired length. The method includes cutting a plurality of openings in the cylindrical member wherein the cutting step includes rotating the cylindrical member about the longitudinal axes while causing a cutting means to move linearly along the length of the cylindrical member. At least two of the openings are located in spaced relation along the length of the cylindrical member with the openings having a predetermined angular relation therebetween with respect to the longitudinal axis of the cylindrical member and with the openings being located in a predetermined reproducible manner.

BRIEF DESCRIPTION OF THE DRAWINGS

My invention will be more fully understood and its several objects and advantages further appreciated by referring now to the following description, taken in conjunction with the accompanying drawings, wherein:

FIG. 4 is a schematic representation of one form of apparatus used in practicing the method of the present invention.

FIG. 5 is a simplified block diagram of a portion of one form of control means for the apparatus of FIG. 4.

FIG. 9 is a schematic representation, similar to FIG. 4, showing a preferred form of applicant's invention in which a bus conductor is fabricated on one portion of the apparatus and a mating enclosure is fabricated on another portion of the apparatus.

FIG. 10 is a highly schematic representation of the control and drive means of the apparatus shown in FIG. 4.

DETAILED DESCRIPTION OF THE INVENTION

Figure 1:
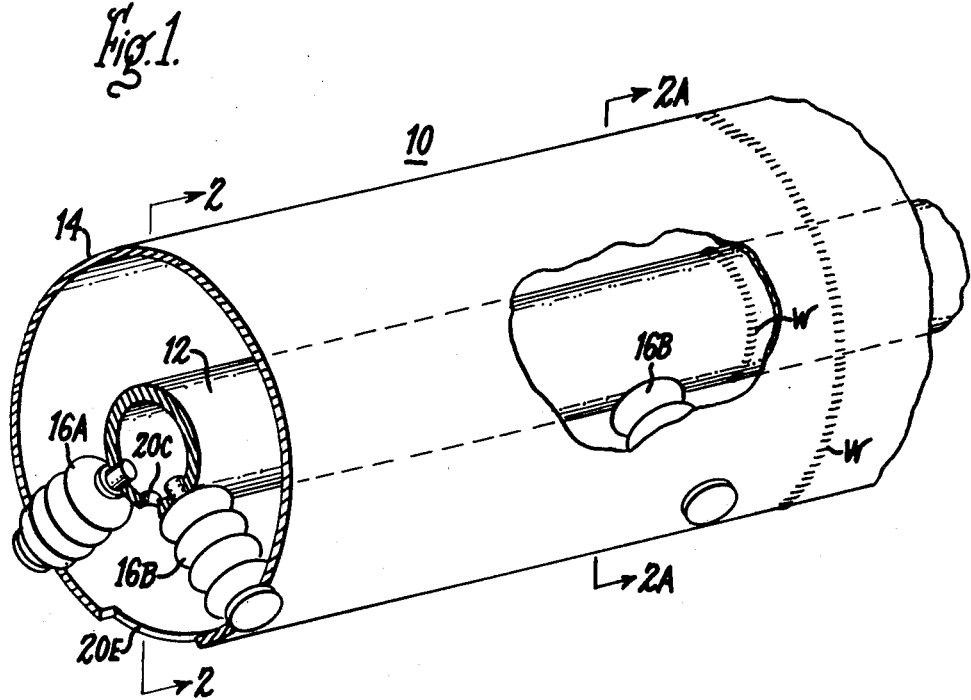
FIG. 1 is a partially cut away perspective view of one form of isolated phase bus system to which the method of the present invention is applicable.

Referring now to FIG. 4, one form of applicant's apparatus invention is generally designated 30. The apparatus 30 includes a pair of rotatable headstocks 32A, 32B, each headstock being of a configuration adapted to securely receive an end of a first one of a plurality of cylindrical workpieces of a given diameter. Exemplary cylindrical workpieces 44 are shown in phantom and will be discussed later. The rotatable headstocks 32A, 32B, are disposed such that their axes of rotation are substantially coincident. The rotatable headstocks 32A, 32B, are separately driven by drive means 34A, 34B respectively. A side beam 36 is disposed adjacent to the headstocks 32A, 32B, and extends along a line parallel to the axis of rotation of the rotatable headstocks. Coupled to the side beam 36 is a pair of welding means 38A, 38B which typically comprise GMAWU units (gas metal arc welding units). The welding means 38A, 38B, are respectively coupled to the side beam 36 in such a manner as to be capable of translation along the length of the side beam 36. More particularly, the welding means 38A, 38B are respectively fixed to motorized carriages, each of which is independently controlled and includes indicia means, e.g., digital read out, for displaying linear position along the side beam 36. Preferably, each such motorized carriage moves along the side beam as a result of its motor driven pinion (not shown) engaging a rack (not shown) which is provided along the length of the side beam 36. For purposes of clarity, the welding means 38A, 38B have each been simply illustrated as a single motorized unit. The first welding means 38A, and the second welding means 38B, each includes a welding electrode 39A, 39B, respectively.

Also coupled to the side beam 36 is a cutting means 40 which includes a cutting tool in the form of a torch 41. The cutting means 40 typically comprises a plasma arc cutting torch and, preferably includes automatic control. One suitable cutting means is commercially available from Thermal Dynamics Corp. of New Hampshire under the designation PMC-70. The cutting means 40 is coupled to the side beam 36 between the first and second welding means 38A, 38B in a manner such that it too is capable of translation along the length of the side beam 36. Typically, the cutting means 40 is coupled to the side beam 36 through another motorized carriage (not separately shown). The apparatus 30 also preferably includes support means 42 for supporting the cylindrical workpiece(s) 44. The workpiece support means 42 may simply comprise one or more idler roll assemblies.

Apparatus control means 50 is provided for coordinating at least some of the functions of the various elements of the apparatus 30. The apparatus control means 50 includes a control unit 46 which provides an operator with the ability to select one or more of several functions useful in the fabrication of an isolated phase bus system such as the exemplary system 10 shown in FIG. 1. The control unit 46 may also include display means relating to such fabrication.

Referring now to FIG. 5, a portion 50' of one form of the apparatus control means 50 of FIG. 4 is further depicted in simplified block diagram form. The portion 50' is intended to depict that portion of the apparatus control means 50 of FIG. 4 which is directed toward the rotation of the workpieces. In a preferred embodiment, the operator control unit 46 is coupled to coordinating control means 52 which comprises a digital computer, e.g., the one commercially available under the designation Motorola #6800 series. The coupling between the operator control unit 46 and the coordinating control means 52 includes an INPUT A for activating the control means 52 and an OUTPUT A for indicating the status of the fabrication.

The apparatus control means 50' includes two rotational control loops. One control loop is an Analog Velocity Control Loop and the other control loop is a Digital Position Control Loop. In response to INPUT A, the coordinating control means 52 produces a digital OUTPUT B which is converted to analog form by a digital-to-analog converter 54. The analog output of the digital-to-analog converter 54 is directed to power amplifier 56, e.g., the one commercially available under the designation Westamp #652. The electrical output of power amplifier 56 is directed to motor 58 whose mechanical output is related to the magnitude of the power amplifier output. The mechanical output, i.e., mechanical movement, of motor 58 is directed to move at least one of the operating elements of the apparatus 30 shown in FIG. 4. For example, in the portion 50' of FIG. 5, the motor 58 may be coupled to the rotatable headstock 32A wherein the mechanical output of motor 58 causes the rotation of the headstock 32A. Typically, the motor 58 is coupled to the headstock(s) through gearing means so as to provide various rotational speeds.

Referring now to the Analog Velocity Control Loop, the output of the motor 58 is measured by tachometer 60 which includes a high resolution shaft encoder e.g., the one commercially available under the designated Renco Encoder. The electrical output of the tachometer 60 is directed back to the power amplifier 56 as a feedback input thereto. The tachometer 60 is set at a value such that its output signal provides a feedback input signal which provides the desired power amplifier output, and hence, the desired mechanical output of motor 58.

The Digital Position Control loop continues from the motor 58 to a high resolution shaft encoder 62, e.g., the one commercially available under the designation Renco Encoder. The shaft encoder 62 functions to develop electrical pulses representative of a predetermined mechanical motion developed by the shaft of motor 58. For example, such a shaft encoder 62 may develop an electrical pulse at each revolution of the shaft of motor 58. Accordingly, depending upon the gearing between the motor 58 and the rotated headstock 32A or 32B, each such electrical pulse is a measure of some incremental rotational movement of the rotatable headstock 32A or 32B. The electrical pulses from the high resolution shaft encoder 62 are directed back to the control means 52 through INPUT (B). The control means 52 preferably includes a "counter" function which accumulates, or counts, the electrical pulses from the high resolution shaft encoder 62. In one form of the present invention, the control means 52 includes a "counter" function which separately counts the electrical pulses from the high resolution shaft encoder 62 with pulses indicative of clockwise rotation of the rotatable headstocks 32A or 32B, adding to the control means counter and pulses indicative of counterclockwise rotation of the rotatable headstocks 32A or 32B, subtracting from the control means counter. In such an application, if the control means 52 is provided with a particular count to look for (the count being representative of a desired rotation of the rotatable headstock 32A, 32B), the control means 52 will cause the motor 58 to be driven (at the predetermined analog velocity set by the tachometer 60) until that particular count is reached. Note that the above rotational counting function of the control means 52 represents the angular position of the rotatable headstocks with respect to a given start point and can be displayed on the control unit 46, if desired.

In addition to the portion 50' of the control means 50 shown in FIG. 5, control means are also respectively provided for the linear movement and activation of the welding and cutting means 38A, 38B, 40 along the side beam 36. More particularly, such linear control means (not completely shown in FIG. 5) is typically identical to the rotational control means 50' except that two linear control loops and another motor, such as motor 58, are provided to provide horizontal movement of at least one of the operating elements of the apparatus 30 shown in FIG. 4. For example, in the case of welding, another motor is operable to cause the welding means 38A to move horizontally along the side beam 36 from one point to another point. Preferably, for linear movement along the side beam 36, the mechanical output of the motor is separately coupled to each of the operating elements through a rack and pinion drive (not shown). That is, each operating element has its own motorized carriage with a pinion for coacting with a rack which is provided on the side beam 36.

In the linear control means, the shaft encoder 62 develops electrical impulses in which each pulse is a measure of an incremental movement of an operating element(s) along the side beam 36. The electrical pulses from this shaft encoder are also directed back to a common control means 52 through another INPUT B. The control means 52 includes a separate "counter" function which accumulates, or counts, these electrical pulses from the high resolution shaft encoder 62. In one form of the present invention, forward direction pulses (pulses indicative of left-to-right movement along the side beam 36) add to the control means counter, while reverse direction pulses (pulses indicative of right-to-left movement along the side beam 36) subtract from the control means counter. In such an application, if the control means 52 is provided with a particular count to look for (the count being representative of a desired translation along the side beam 36), the control means 52 will cause the linear motor 58 to be driven (at the predetermined analog velocity set by the tachometer 60) until that particular count is reached.

As a safety measure, the control means 52 is preferably provided with the capability such that, should an improper condition occur, such as a loss of control over the motor 58, where the motor 58 represents rotational or linear motor means, the control means 52 will stop all motion because the observed counts are much greater than should be observed in a particular time interval. Such capability can be provided by tachometer 60.

Figure 6:
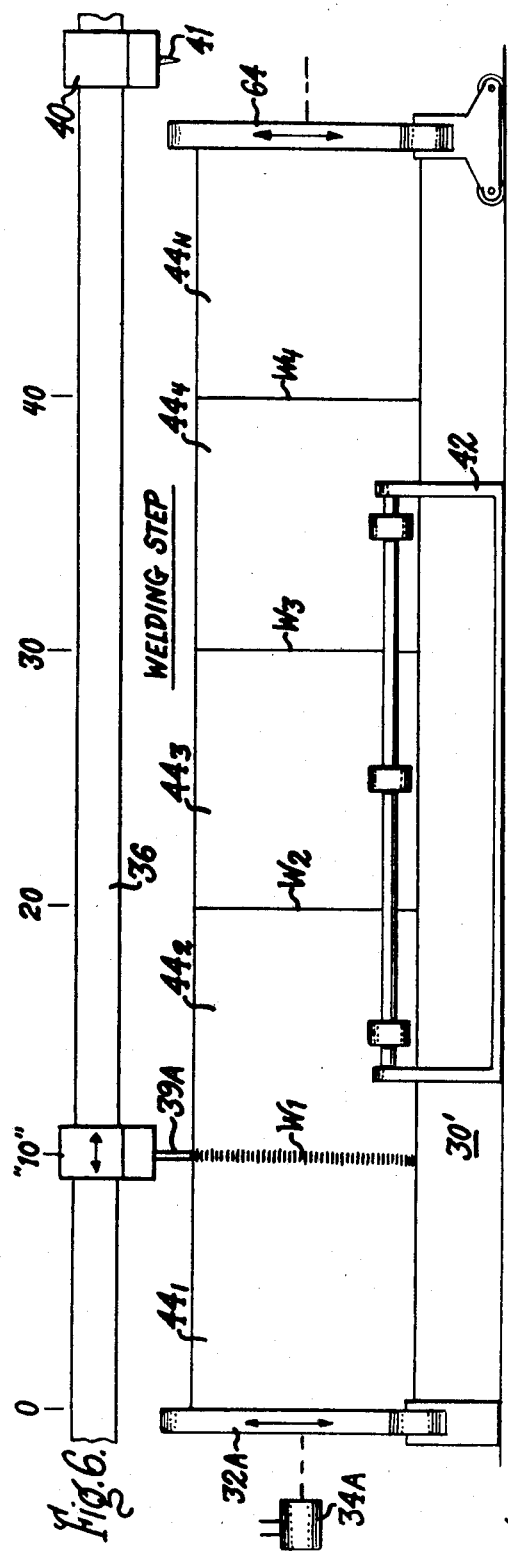
FIG. 6 is a schematic representation of one form of apparatus of the present invention similar to the apparatus of FIG. 4 in which one form of the welding step of the present invention is schematically depicted.

Referring to FIG. 6, a preferred form of the present invention will now be described. The apparatus, generally designated, 30', employed in this preferred form of applicant's method invention is similar to the apparatus 30 of FIG. 4 with some modification thereof. Wherever possible, the reference designations of FIG. 4 have been maintained. The apparatus 30' shown in FIG. 6 may be considered as representing only a portion of the apparatus 30 of FIG. 4, omitting: the second rotatable headstock 32B and its associated drive means 34B; and, the second welding means 38B. In place of the second rotatable headstock 32B, a movable rotatable tail stock 64 is provided.

In carrying out the method of the present invention with the apparatus 30' of FIG. 6, a first plurality of cylindrical metal workpieces $44_1 \ldots 44_N$ of a given first diameter are provided. For example, in the case of fabricating an enclosure for an isolated phase bus system, a typical cylindrical metal workpiece may be of the order of $\frac{3}{8}$" thick and about 40" in diameter, with a total desired enclosure length of about 45 feet. These cylindrical workpieces $44_1$ to $44_N$ are disposed in the apparatus 30' and aligned such that the longitudinal axes of the cylindrical workpieces $44_1$, $44_N$ are substantially coincident. The support means 42 and movable rotatable tailstock 64 are employed to assist in ensuring such coincidence. The movable rotatable tailstock 64 is urged against the exposed end of the last cylindrical workpiece $44_N$ to ready the plurality of cylindrical workpieces for the welding step.

The welding step comprises moving the welding means 38A to a position along the side beam 36 such that the welding electrode 39A is aligned with the workpiece edges to be welded together. To provide the necessary operating room, cutting means 40 is generally moved to the right beyond the tailstock 64. In FIG. 6, the welding means 38 is shown at position "10" (position 0 being a starting point left-to-right) on the side beam 36 such that its welding electrode 39A is directly in alignment with the first weld (W1) going from left-to-right. Note that each cylindrical workpiece 44 is typically of a given module length, i.e., 10 feet, such that the necessary welding step is repeated every 10 feet along the length of the side beam 36. For example, in the apparatus 30' shown in FIG. 6, such welds W2, W3, W4 are eventually provided at locations 20, 30, 40, along the side beam 36.

Referring again to the first weld, W1, when the welding means 38A, and its welding electrode 39A are properly located at W1 (position "10"), the drive means 34A rotates the rotatable headstock 32A, hence, the entire assembly of cylindrical workpieces $44_1 \ldots 44_N$, for a period of rotation of 360°. During this 360° rotation, the welding electrode 39A is activated so as to provide a complete weld W1. After completion of weld W1, the welding means 38 is moved along the side beam 36 where the process is repeated to produce weld W2. At the conclusion of the welding step, the result is a plurality of cylindrical workpieces $44_1$ to $44_N$ welded together in end-to-end manner. It is to be appreciated that the welding step can be practiced manually or automatically or a combination thereof. That is, an operator may simply locate the welding means 38A at the proper locations, e.g., (position 10, 20, 30, 40) and, at such location(s), then activate the welding electrode 39A and rotate the rotatable headstock 32A for 360°. Alternatively, the positioning and activation of the welding step may be automatically directed by the computer control means 52. That is, the computer control means 52 may be programmed to move the welding means 38 through the desired locations (10, 20, 30, 40) and, at such locations, activate the welding electrode 39A and rotate the rotatable headstock 32A for 360°.

The next step in the method of the present invention is the cutting of mounting and access openings 18E, 20E in the enclosure 14. These openings 18E, 20E were previously discussed in connection with FIGS. 1–3.

Figure 7:
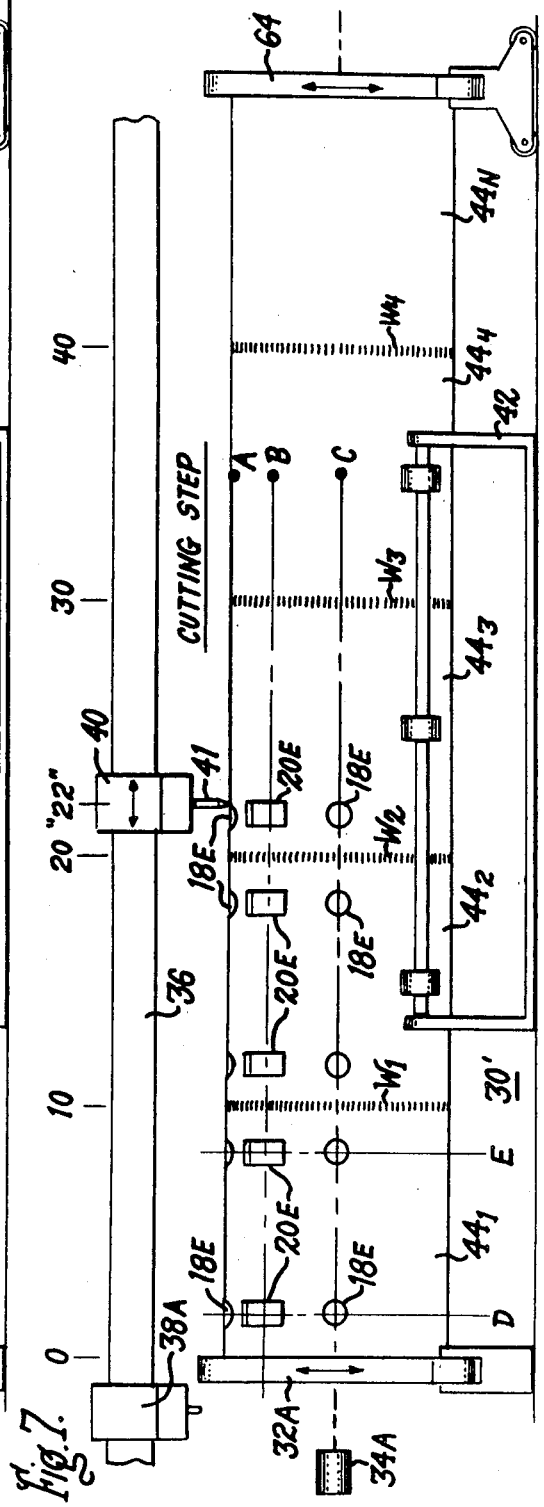
FIG. 7 is a schematic representation, taken as in FIG. 6, in which one form of the cutting step of the present invention is schematically depicted.

Referring now to FIG. 7, in carrying out the cutting step, the welding means 38A is preferably moved to an extreme end (e.g., near position 0) of the side beam 36 as its function has been accomplished (compare FIGS. 6, 7). In the cutting step, the cutting means 40 and its cutting tool 41 are moved along the length of the side beam 36 in a predetermined reproducible coordination with the rotation of rotatable headstock 32A. As shown in FIG. 7, the cutting means 40 has been moved from an initial left-hand position to a position "22" along the length of the side beam 36. In its movement along the side beam 36 from position "0" to position "22", the cutting means 40 has been selectively activated in predetermined reproducible coordination with the rotation of the rotatable headstock 32A so as to produce a plurality of openings 18E, 20E. More particularly, as shown in FIG. 7, the cutting means 40 is in the process of making mounting opening 18E in cylindrical workpiece $44_3$. It is important to note that each of the already provided openings 18E, 20E is precisely located both angularly and longitudinally in a predetermined reproducible manner, as required for the proper assembly of isolated phase bus systems. More particularly, the centers of the openings 18E, 20E are respectively aligned along the axes A, B, C and D, E, F (see also FIGS. 1–3).

Figure 8:
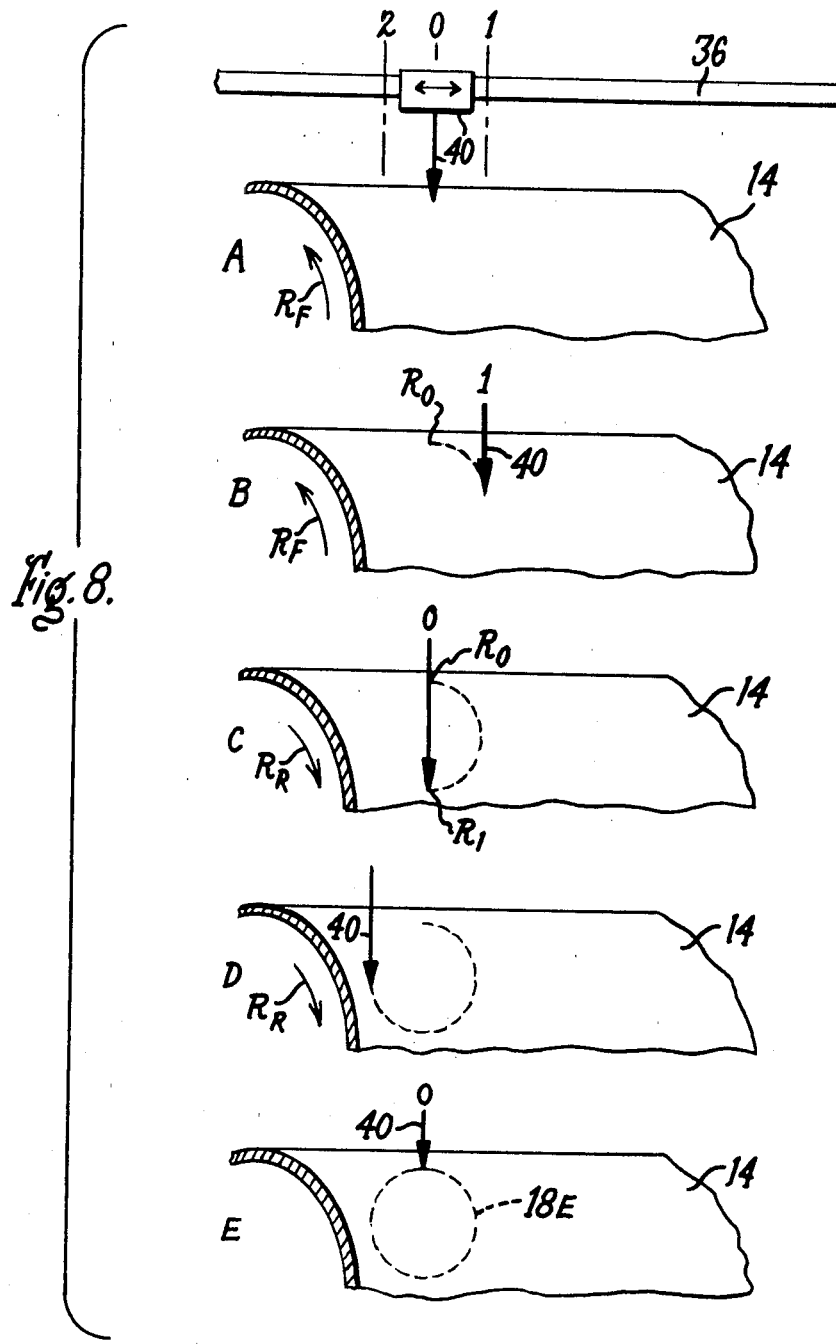
FIG. 8 is a diagrammatic representation showing the manner in which the cutting step shown in FIG. 7 is accomplished.

Referring now to FIG. 8, a further discussion of the manner in which the cutting step shown in FIG. 7 is accomplished is diagrammatically depicted. FIG. 8A shows a portion of the enclosure 14 (welded together workpieces $44_1 \ldots 44_N$) at the initiation of a particular cut. For the purposes of illustration, the particular cut will be taken to be a circular cut such as the mounting opening 18E of FIGS. 2, 3, 7. Also, for purposes of illustration, the cutting means 40 will be initially taken to be at a reference location along the side beam 36 indicated at the top of FIG. 8 as zero (0).

From the reference point zero (0) of FIG. 8A, the cutting means 40 is activated and linearly moved to the right to position 1 at a constant rate while the enclosure 14 is rotated (via rotatable headstock 32A) in a counterclockwise or forward manner at a constant rotational rate, designated $R_F$. The linear rate and the rate of rotation $R_F$ are determined by the setting on the tachometer 60 and the gearing between: the motor(s) 58 and the element(s) on the side beam 36, and the motor 58 and the rotatable headstocks 32A or 32B. The interaction of the linear motion of the cutting means 40 from zero to 1 position and the forward rotation $R_F$ of the enclosure 14 produces a cut shown in dashed lines in FIG. 8B. While rotation of the enclosure 14 continues in this forward direction $R_F$ at the same rate, the cutting means 40 is brought back to zero position. The result thus far is the half circle cut shown in dashed lines in FIG. 8C. The cutting means 40 is then moved leftward to position 2 while the enclosure 14 is rotated in a reverse direction $R_R$, i.e., clockwise. The reverse rotation $R_R$ is at the same rate of speed as the forward rotation $R_F$. This results in the cut shown in FIG. 8D. The cutting means 40 is moved back to zero position while continuing to rotate the enclosure 14 in the reverse or clockwise direction $R_R$. This results in the desired circular cut 18E shown in FIG. 8E. Thus, for such a circular cut 18E the left and right linear speed of the cutting means 40 is substantially the same and the forward and reverse rate of rotation of the enclosure 14 is maintained substantially the same. An important feature of the cutting step is that, during the cutting, the distance from the cutting tool 40 to the surface of the workpiece 14 to be cut is maintained substantially uniform. This uniformity of distance ensures accurate and efficient cutting.

It is to be appreciated that, it is preferable to precede the diagrammatic depiction of FIG. 8A with an initial locating position at the center of the opening to be cut, and then to move outward to the periphery of the opening.

For the circular type cut shown in FIG. 8, the relation between the linear and rotational speeds during the cutting operation will now be discussed. Referring to the half-circle cut shown in FIG. 8A, 8B, 8C, the cutting means 40 should move the linear distance defined by position 0 to 1 to 0 in the same time period that the cutting means 40 moves the rotational (circumferential) distance defined by position $R_0$ to $R_1$. For example, consider the situation in which the complete rotation of the rotatable headstock includes 360 increments as seen by the rotational shaft encoder 62. In such a situation, the rotational distance defined by position $R_0$ to $R_1$ may, for example, comprise 20 increments and the linear distance defined by position 0 to 1 to 0 may, for example, also comprise 20 increments as seen by the linear shaft encoder 62. For this situation, the 20 rotational units should be counted in the same time period as the 20 linear units. That is, the linear speed should be 20 linear units over a time period t and the rotational speed should be 20 rotational units over the same time period t. For some applications, it may be useful to vary the rotational speed between positions $R_0$ to $R_1$ with the speed being greater at, and near, these positions as compared to positions therebetween. Such variation may be provided to compensate for the "falling off" of the cylindrical surface of 14 at positions $R_0$, $R_1$. Such variation may be provided by programming the computer 52 of FIG. 5 with the appropriate information. For further discussion, reference may be taken to U.S. Pat. No. 2,974,415, issued Mar. 14, 1961 to Werner, entitled "Tool Guiding Device For Guiding A Tool Along The Curves Of Intersection of Two Intersecting Tubes" for a discussion of cutting cylindrical tubes.

The welding and cutting of the bus conductor member 12 (see FIGS. 1-3) are accomplished in substantially the same manner as previously described in connection with the fabrication of the mating enclosure 14.

In a preferred form of applicant's method, the cutting and welding of the bus conductor 12 are accomplished on the (right-hand) portion of the apparatus 30 of FIG. 4 not utilized in the apparatus 30' of FIG. 6. More particularly, the cylindrical workpieces $44_1 \ldots 44_N$ for the cylindrical bus conductor 12 can be disposed between the second rotatable headstock 32B of FIG. 4 and a second movable rotatable tailstock 64, as shown in FIG. 9. For example, referring to FIG. 9, the left-hand portion of the apparatus 30 of FIG. 4 is employed for the fabrication of the enclosure 14 and the right hand portion of the apparatus 30 of FIG. 4 is employed for the fabrication of the bus conductor 12. The previously unutilized (right-hand) portion of the apparatus 30 also includes the second welding means 38B and employs the common cutting means 40. In carrying out this form of applicant's method to fabricate the bus conductor 12, the welding step and cutting step are performed in substantially the same manner as previously described in connection with the enclosure 14 but the starting point for such operations is at a relative zero point at the extreme right-hand side of the side beam 36. This would produce a bus conductor 12 having welds and mounting/access openings 18C and 20C which are precisely located, both angularly and longitudinally, in a predetermined reproducible manner.

An advantage of the foregoing form of applicant's invention in which the bus conductor 12 is fabricated on one portion of an apparatus and the mating enclosure 14 is fabricated on another portion of the same apparatus is that, if desired, the bus conductor 12 and mating enclosure 14 can be fabricated substantially at the same time, or, during some overlapping time period. Another advantage of this form of applicant's invention, as will soon be apparent, is simplified assembly of the isolated phase bus system.

Figure 2:
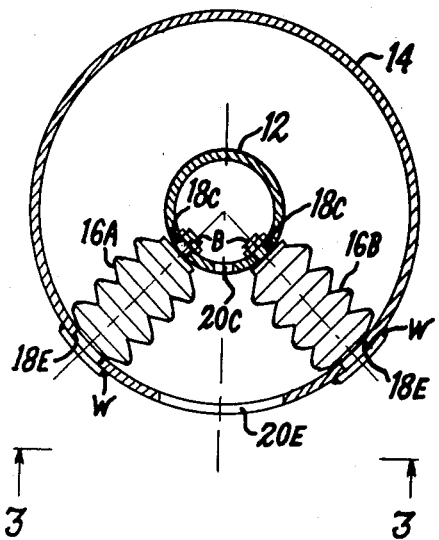
FIG. 2 is a sectional view taken along line 2—2, or 2A—2A, of FIG. 1.
Figure 3:
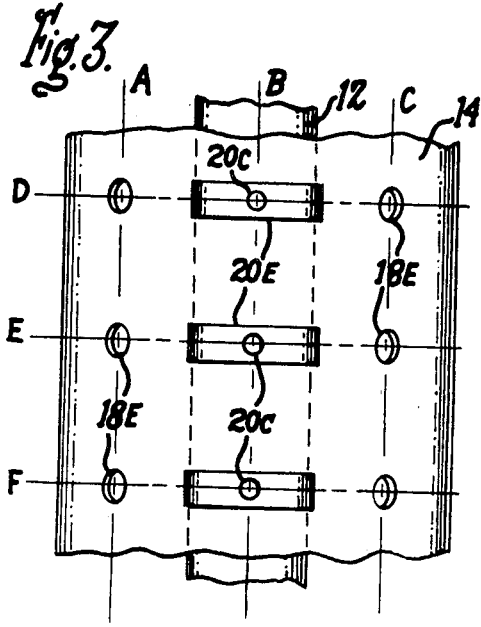
FIG. 3 is a partial bottom view taken along line 3—3 of FIG. 2.

With the now-completed bus conductor 12 and mating enclosure 14, the next step is to assemble the isolated phase but system 10, as shown in FIGS. 1-3. This is accomplished by aligning the enclosure mounting, access openings 18E, 20E with the respective bus conductor mounting, access openings 18C, 20C. The relatively fragile insulator assemblies 16A, 16B are then joined at one end thereof to the enclosure 14 and at the opposing end thereof to the bus conductor 12, as shown in FIGS. 1, 2. Typically, the joining of the insulator assemblies 16A, 16B, to the enclosure 14 is accomplished through the use of a welding interface W at each enclosure opening 18E. The respective joining of the insulator assemblies 16A, 16B, to the bus conductor 12 is generally accomplished through the use of a threaded boss B at each conductor opening 18C. The angularly and longitudinally aligned enclosure access openings 20E and bus conductor access opening 20C provide access to the assembler for properly securing and/or servicing the insulator assemblies 16A, 16B.

It is important to appreciate that, as the openings cut in the enclosure 14 and bus conductor 12 are processed in substantially the same manner, these openings are precisely, and reproducibly, located so that angular and longitudinal alignment is provided, as desired. This longitudinal and angular alignment reduces the possibility of physical stresses being placed upon the relatively fragile insulator assemblies 16A, 16B, during the assembly of the isolated phase bus system 10. When the bus conductor 12 and mating enclosure 14 are fabricated on different portions of the same apparatus, as in FIG. 9, if desired, the assembly of the isolated phase bus system 10 can be simply initiated by sliding the smaller diameter bus conductor 12 into the larger diameter mating enclosure 14.

It is not necessary that the bus conductor 12 and mating enclosure 14 be fabricated on different portions of the same apparatus, as in FIG. 9. For example, the bus conductor 12 and the mating enclosure 14 can be successively fabricated on the same portion of the apparatus or on separate apparatus, i.e., separate fixtures. Indeed, for some applications, the foregoing successive fabrication on the same portion of the apparatus may be desirable as it results in a degree of reproducibility which may be greater than that resulting from using the different portions of the same apparatus.

General Considerations

Although the present invention has been described in connection with an exemplary isolated phase bus system 10 including double insulator assemblies (16A, 16B of FIGS. 1, 2), the method and apparatus are generally applicable to other isolated phase bus systems. For example, for an isolated phase bus system including single longitudinally spaced insulator assemblies, the problem of alignment of bus conductor openings and mating enclosure openings would still be present, although to a lesser degree. That is, although angular and longitudinal alignment of the appropriate openings is required, a fewer number of such openings would be involved as compared to the number of openings involved in the double insulator assembly situation depicted in FIGS. 1–3. Indeed, the method and apparatus of the present invention are generally applicable to isolated phase bus systems in which it is necessary to provide a cylindrical bus conductor and a mating cylindrical enclosure with each member having at least two openings spaced along the length thereof with the two openings of each of the members having a predetermined angular relation therebetween with respect to the longitudinal axis thereof. For example, in a simple application, such two spaced openings along the length of the bus conductor would be at substantially the same angular position with respect to the longitudinal axis thereof. Further, the method and apparatus of the present invention are also applicable to the fabrication of either the bus conductor or the enclosure in the isolated phase bus system.

Referring now to FIG. 10, a highly schematic representation of the control and drive means of the apparatus 30 of FIG. 4, and 30' of FIGS. 6, 7, is depicted. For purposes of simplification, FIG. 10 depicts the multifunction capabilities of the apparatus of the present invention separately. It is helpful to refer to FIG. 10 as, in some applications, the entire multifunctional capability of the apparatus 30, 30', of the present invention may not be required. For example, the apparatus may be required simply to provide precisely and reproducibly located openings without providing the welding function.

In FIG. 10, the rotatable headstock 32A is shown coupled to First Drive means 100 which may comprise the drive means 34A of FIG. 4. The First Drive means 100 is controlled by First Control Means 102 which may comprise a separately operable subunit of a computer. The first and second welding means 38A, 38B are individually driven by Second Drive Means 104 and Second Control Means 106 which is similar to First Control Means 102. Suitable Operation of First and Second Control Means 102, 106 results in the previously described welding step. Such suitable operation may be accomplished through Fourth Control Means 108 which, preferably, but not necessarily, comprises a computer. The cutting means 40 is driven by Third Drive Means 110 and controlled by Third Control Means 112. Suitable operation of First and Third Control Means 102, 112, results in the previously described cutting step. Such suitable operation of First and Third Control Means 102, 112 may be accomplished through the Fourth Control Means 108. The functions of control means 102, 106, 112, 108 of FIG. 10 may be conveniently viewed as contained within computer control means 52 of FIG. 5. In a preferred form of applicant's invention, at least the cutting step is accomplished through the use of computer control of the First Drive Means 100 and the Third Drive Means 110. That is, in such a preferred form, Fourth Control Means 108 comprises a computer which includes First Control Means 102 and Third Control Means 112. An advantage of employing such a computer is that the computer can be programmed to reproducibly and automatically control the cutting and/or welding steps.

Although the method and apparatus of the present invention have been generally discussed in connection with circular openings, the invention is generally applicable to openings of any configuration, e.g., square, rectangular, triangular, irregular, etc.

While I have illustrated preferred embodiments of my invention by way of illustration, many modifications will occur to those skilled in the art and I therefore wish to have it understood that I intend in the appended claims to cover all such modifications as fall within the true spirit and scope of my invention.

What is claimed as new and desired to be secured by Letters Patent of the United States is:

1. In a method of fabricating an isolated phase bus system, the isolated phase bus system including a cylindrical bus conductor and a mating enclosure therefor, the mating enclosure having a larger diameter than the cylindrical conductor, comprising the steps of:
   (a) fabricating said cylindrical bus conductor, including the steps of:
      (1) providing a first plurality of cylindrical workpieces of a first diameter,
      (2) disposing said first plurality of workpieces in a fixture and aligning said cylindrical workpieces such that the longitudinal axes thereof are substantially coincident,
      (3) rotating said workpieces together in said fixture about said longitudinal axes,
      (4) welding said workpieces to one another end-to-end while said workpieces are rotating to form a cylindrical bus conductor of a desired length,
      (5) cutting a plurality of openings in said bus conductor while it remains in said fixture, for receiving mounting hardware, at least two of said openings being located in spaced relation along the length of said bus conductor, said two openings having a predetermined angular relation therebetween with respect to the longitudinal axis of said bus conductor, the cutting step including precisely locating said openings in a predetermined reproducible manner, and
   (b) fabricating said mating enclosure, including the steps of:

(1) providing a second plurality of cylindrical workpieces, said second plurality of cylindrical workpieces having a larger diameter than said first plurality of workpieces, (2) disposing said second plurality of workpieces in a fixture and aligning said second plurality of cylindrical workpieces such that the longitudinal axes thereof are substantially coincident, (3) rotating said second plurality of workpieces together in said fixture about said longitudinal axes, (4) welding said second plurality of workpieces to one another end-to-end while said workpieces are rotating to form an enclosure of a desired length, (5) cutting a plurality of openings in said enclosure while it remains in said fixture, the cutting step being performed substantially as in step (a) 5, said openings in said enclosure including openings which are precisely located in said predetermined reproducible manner so that said enclosure openings are substantially longitudinally and angularly aligned with said bus conductor openings formed in step (a) 5.

2. A method in accordance with claim 1 in which the length of each of said first plurality of cylindrical workpieces is of a given module length.

3. A method in accordance with claim 2 in which the length of each of said second plurality of cylindrical workpieces is of the same given modular length.

4. A method in accordance with claim 1 in which said cutting steps of (a) 5 and (b) 5 include the step of rotating said welded-together workpieces while causing a cutting means to move linearly along the length of said welded-together workpieces.

5. A method in accordance with claim 4 in which said cutting steps of (a) 5 and (b) 5 are automatically processed.

6. A method in accordance with claim 4 in which steps (a) and (b) are carried out on different portions of an apparatus for fabricating an isolated phase bus system.

7. A method in accordance with claim 6 in which steps (a) and (b) are carried out on substantially the same portion of said apparatus.

8. A method in accordance with claim 4 in which said cutting steps of (a) 5 and (b) 5 include cutting a plurality of angularly spaced openings at each point along the lengths of said bus conductor and said mating enclosure.

* * * * *